No. 662,924. Patented Dec. 4, 1900.
C. DUGON.
MACHINE FOR CUTTING GLASS.
(Application filed Feb. 14, 1900.)
(No Model.)
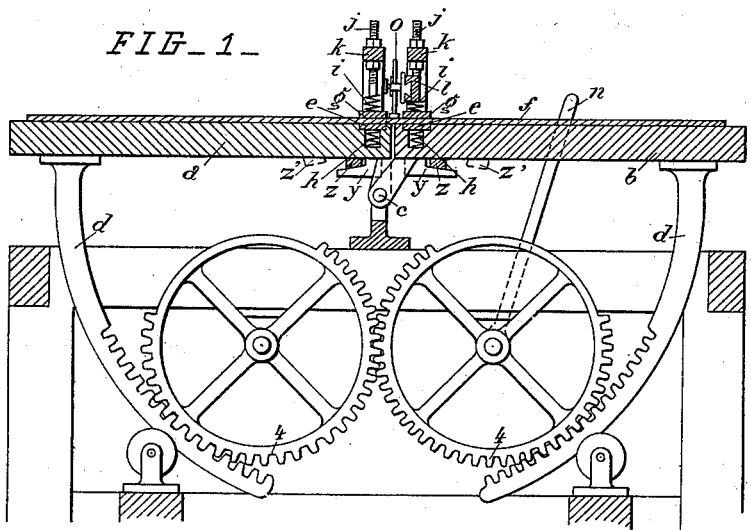
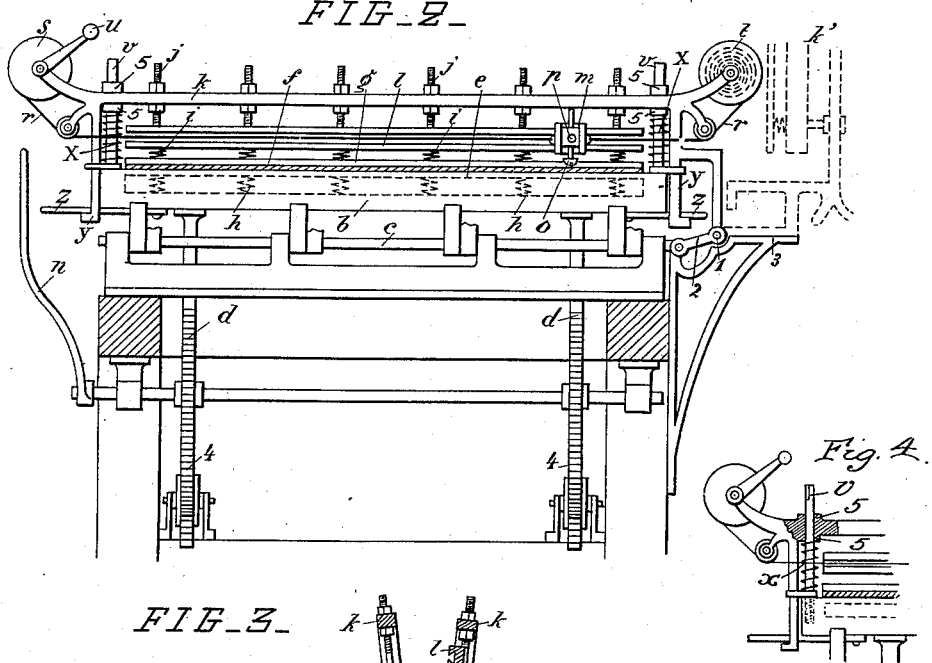
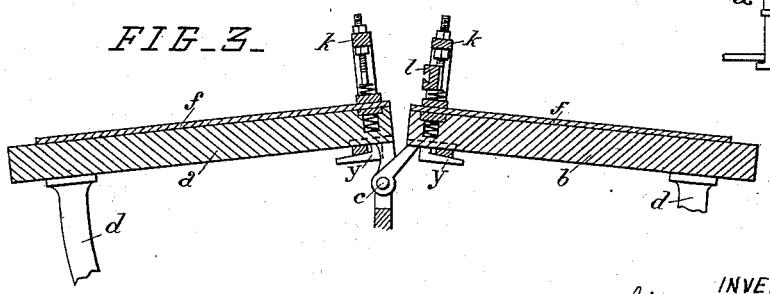
WITNESSES:
Ella L. Giles
INVENTOR
Charles Dugon
BY
Richards & Co.
ATTORNEYS

UNITED STATES PATENT OFFICE.

CHARLES DUGON, OF LYONS, FRANCE.

MACHINE FOR CUTTING GLASS.

SPECIFICATION forming part of Letters Patent No. 662,924, dated December 4, 1900.

Application filed February 14, 1900. Serial No. 5,162. (No model.)

*To all whom it may concern:*

Be it known that I, CHARLES DUGON, a citizen of France, residing at Lyons, France, have invented a new and useful Machine for Cutting Glass, of which the following is a full, clear, and exact description, and for which I have made application for patent in France, dated the 26th of July, 1899, and in Great Britain, dated the 8th of January, 1900, of which the following is a full, clear, and exact description.

The machine forming the subject of the present invention has for its object to cut and separate on right lines large sheets of glass or looking-glass.

The machine is represented in the accompanying drawings, in which—

Figure 1 is a vertical cross-section in a plane at right angles with the direction of the cut. Fig. 2 is a vertical longitudinal section in a plane parallel with the line of cut. Fig. 3 is a cross-section of parts in a different position to that shown in Fig. 1 and showing the separation of the glass after having been cut. Fig. 4 is a sectional view of a detail.

The table supporting the glass is formed of two parts $a$ $b$, the meeting-line of which corresponds with the line of cut of the glass. These half-tables are jointed to a single axle $c$, placed below them and a little to one side of the vertical plane passing through the line of cut. The half-tables also carry toothed sectors $d$ $d$, concentric with the axle $c$ and operated by toothed wheels 4 4, gearing together so as to render their oscillatory movements symmetrical. On the axle of one of the wheels 4 is keyed a lever $n$, by which the half-tables are operated. When, as in Fig. 1, the half-tables $a$ $b$ touch each other, they form a horizontal plane upon which the sheet of glass or of looking-glass $f$ is placed. This sheet is held at each side of the line of cut by two clamping-bars $e$ $g$, the lower one $e$ of which is embedded in the half-tables and is pressed upward by a series of springs $h$. The upper clamping-bars $g$ are carried by two independent frames formed of a cross-bar $k$ and having a series of pins $j$ adjustably fixed along this cross-bar by cuts and carrying springs $i$, pressing upon the clamping-bars. The frames $k$ are guided by vertical rods $v$, fixed to the half-tables. They are held in their raised position by springs $x$; but they can be depressed to grip the sheet of glass by acting on the inclined planes $y$ by means of levers $z$, pivoted to the under side of the half-tables $a$ and $b$.

On one series of pins $j$ is fixed a horizontal slide $l$, along which from one end to the other slides a carriage $m$. Upon this carriage is fixed an ordinary carrier's diamond $o$, the height of which is regulated by a small vertical carriage which is fixed in position by the set-screw $p$. The carriage $m$ is moved by a cord $r$ $r$, Fig. 2, winding at one end upon a spring-barrel $t$, which constantly tends to bring the carriage toward the right-hand side, and at the other end on a pulley $s$, capable of being rotated by a crank-handle $u$.

The bar $k$ is formed with bosses 5 on its upper and lower side to form guides for the bars $v$. As indicated in Fig. 4, the bars $v$ are fixed in the table by being screwed therein, the upper ends of the bars $v$ being squared for this purpose. By unscrewing the bars they can be removed when the bar $k$ is to be raised to the position shown in dotted lines, Fig. 2. This raising of the bar $k$ is not often necessary, however. The springs $i$ to the left of Fig. 1 are fixed on the one hand to the pressing-bar $g$ and on the other hand to the rods $j$. On the right of Fig. 1 and in Fig. 2 the slide $l$ is fixed to the rod $j$, and the springs $i$ are attached on the one hand to the pressing-bar $g$ and on the other hand to the slide $l$.

Having described the construction of the machine, I will now describe its operation.

The half-tables $a$ $b$ being placed in contact with each other, as in Fig. 2, the levers $z$, which hold the clamping-bars $k$ down, are pushed back to the position shown by dotted lines at $z'$. The clamping-bars are then raised by the springs $x$, after which the sheet of glass $f$ can be placed between the clamping-bars $e$ and $g$. After having made the cutting-line to coincide with the junction-line of the half-tables the levers $z$ are caused to act on the inclined planes $y$ to lower the frames $k$, and thereby firmly fix the sheet of glass. By then turning the handle $u$ the carriage $m$ is caused to traverse from right to left and in doing so to cut the glass along the line of junction of the half-tables by the diamond $o$, the height of which has been regulated for this purpose. The lever $n$ is then operated to separate the half-tables $a$ $b$, and consequent on the position of the axle $c$, upon which the half-tables oscillate, these latter at the same time that they separate from each other incline and change level at their point of separation, as shown at Fig. 3. This movement has the effect of separating the two pieces of glass by a simultaneous bending and shearing operation. The two separated pieces of glass can then be removed by allowing the frames $k$ to rise. In order to facilitate the placing in position of large sheets of glass, the entire arrangement of frames $k$, clamping-bars $g$, carriage $m$, and the means of moving the latter can be raised vertically out of the way by turning the whole around the axis 1, carried by a connecting-rod 2, jointed to the framing. The frames $k$ then rest on a horizontal bracket 3 in the position shown by dotted lines at $k'$, Fig. 2.

Having fully described my invention, what I claim, and desire to secure by Letters Patent, is—

1. In a machine for cutting glass the combination of a pair of half-tables forming when joined together a horizontal table, and a common axle to which such half-tables are hinged, said axle being arranged parallel to the line of junction of said half-tables but outside a vertical plane passing through said line so as to separate the glass by the inclination and change of level of said half-tables at the point of separation, substantially as herein set forth.

2. In a machine for cutting glass the combination of a pair of half-tables forming when joined together a horizontal table, a common axle to which such half-tables are hinged, and means for separating and joining the two half-tables consisting of pairs of toothed wheels gearing together and pairs of toothed segments fixed to the half-tables and gearing with the toothed wheels, substantially as herein set forth.

3. In a machine for cutting glass the combination of a pair of half-tables forming when joined together a horizontal table, a common axle to which such half-tables are hinged, means for separating and joining the two half-tables consisting of pairs of toothed wheels gearing together, and pairs of toothed segments fixed to the half-tables and gearing with the toothed wheels, an upwardly-pressed clamping-bar embedded in each half-table near the line of junction of said half-tables, and an adjustable downwardly-pressed clamping-bar mounted in a frame carried by each half-table and coöperating with the upwardly-pressed clamping-bars to grip the sheet of glass, substantially as herein set forth.

4. In a machine for cutting glass, the combination of a pair of half-tables forming when joined together a horizontal table, a common axle to which such half-tables are hinged, means for separating and joining said half-tables consisting of pairs of toothed wheels gearing together, and pairs of toothed segments fixed to the half-tables and gearing with the toothed wheels, an upwardly-pressed clamping-bar embedded in each half-table near the line of junction of said half-tables, an adjustable downwardly-pressed clamping-bar mounted in a frame carried by each half-table and coöperating with the upwardly-pressed clamping-bars to grip the sheet of glass, a slide mounted in one of said frames, a carriage mounted on said slide and a glazier's diamond adjustably mounted in said carriage and acting to cut the glass along the line of junction of the half-tables substantially as herein set forth.

In testimony whereof I affix my signature in presence of two witnesses.

CHARLES DUGON.

Witnesses:
THOS. N. BROWNE,
GASTON JANNIANN.